2,910,117

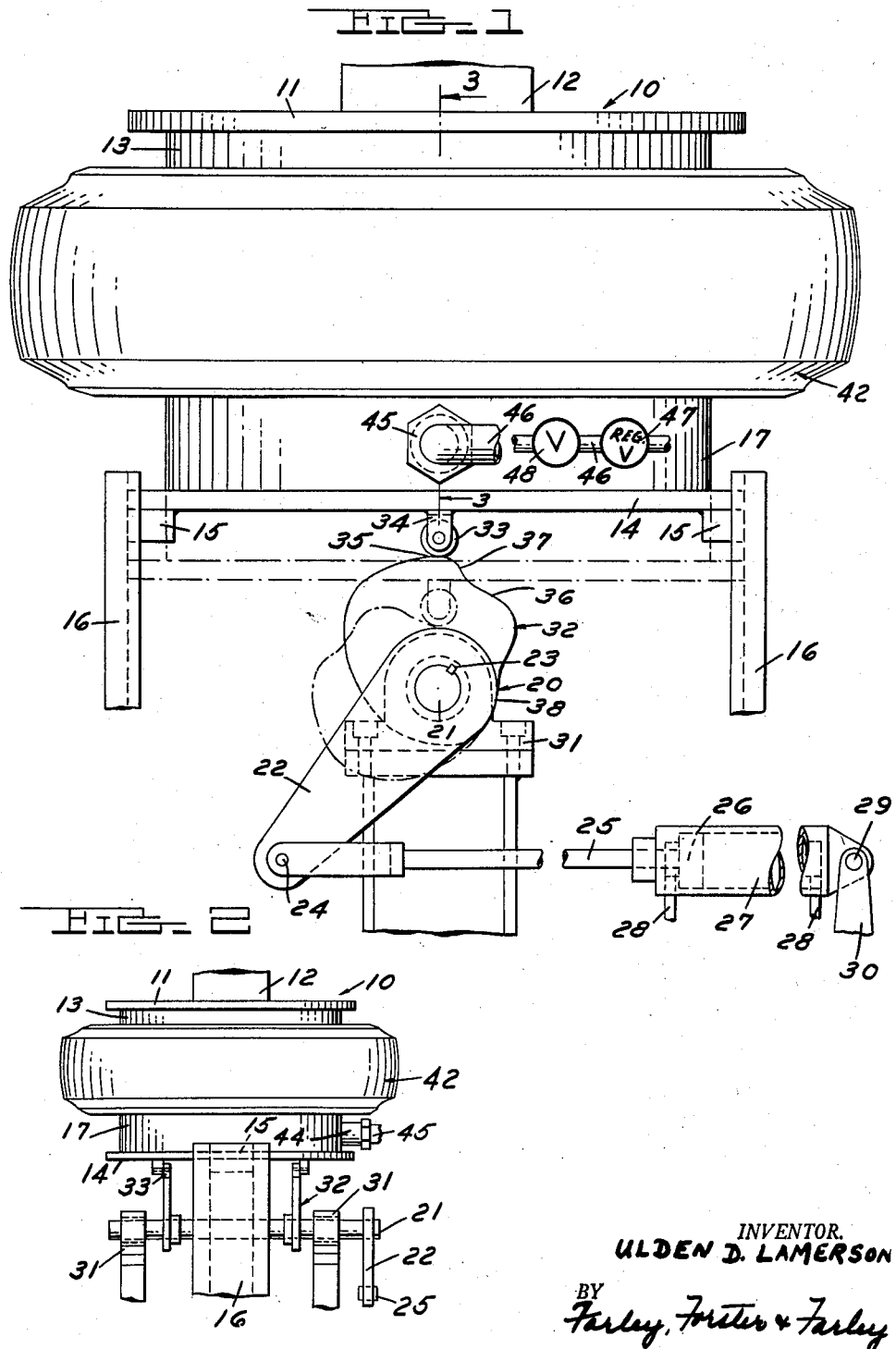

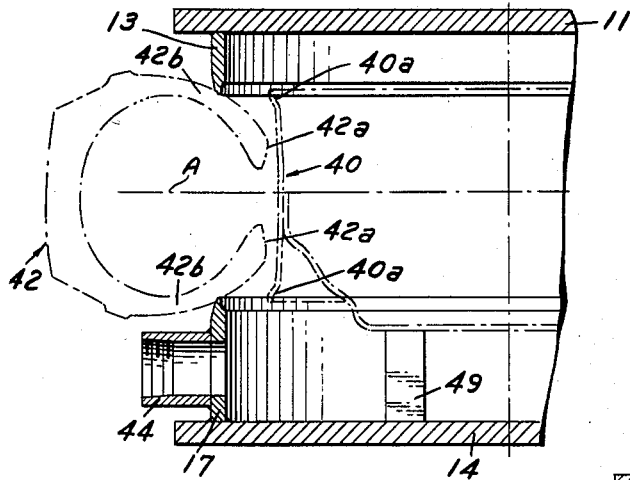
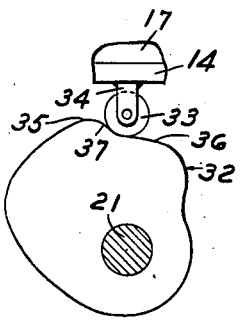
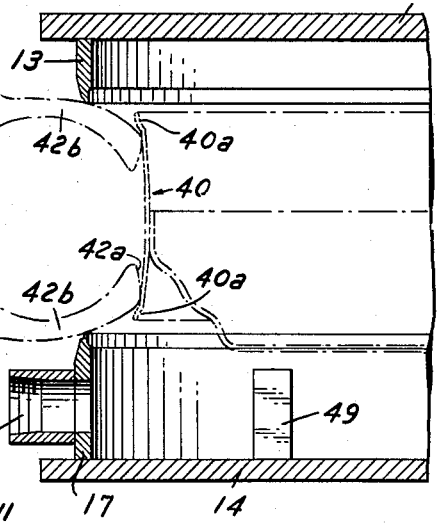
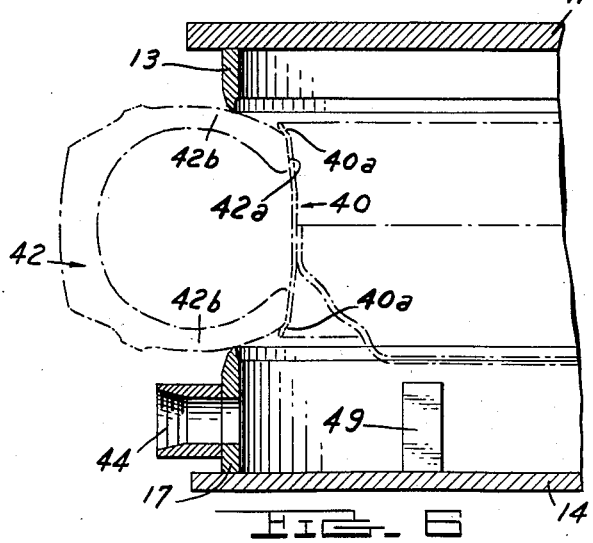
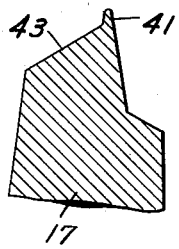
INVENTOR.
ULDEN D. LAMERSON
BY Farley, Forster + Farley
ATTORNEYS United States Patent Office 2,910,117
Patented Oct. 27, 1959

METHOD AND APPARATUS FOR INFLATING A TUBELESS TIRE AND SEATING THE BEADS

Ulden D. Lamerson, Detroit, Mich., assignor to Allied Steel and Conveyors, Division of the Sparks-Withington Company, Jackson, Mich., a corporation of Ohio Application April 23, 1956, Serial No. 579,897

7 Claims. (Cl. 157—1.1)

The present invention relates to a method of and apparatus for inflating a tubeless tire. More particularly, this invention relates to a method of and apparatus for inflating tires by the injection of air at superatmospheric pressures between a tire bead and a wheel rim.

The present invention is particularly adapted for utilization in the inflation of tubeless tires, i.e., tires having relatively thick, reinforced tire beads which sealingly engage with adjacent wheel rim surfaces so that the tire casing is inflated directly without the necessity of utilizing an inner tube. Such tires are now standard equipment on most makes of automobiles, and this type of tire is now being widely utilized for trucks and commercial vehicles provided with relatively larger, high pressure tires capable of withstanding high vehicle loads.

The present invention is particularly adapted to the inflation of truck or other commercial vehicle tires, inasmuch as it provides a method and apparatus whereby the tire bead is forcibly retained from or restrained against rim-engaging movement until after inflation to a predetermined pressure has been effected. By the use of the method and apparatus of the present invention, larger, higher pressure tires of the heavy duty type can be inflated to a uniform inflation pressure with the final sealing of the tire bead to the rim being effected under the tire inflation pressure and only after inflation has been completed.

In a preferred embodiment of the invention, the method of inflation contemplates initially displacing a tire bead away from the associated wheel rim, as by distorting the tire under axial compression. Either one or both tire beads may be displaced or deflected from the associated wheel rim so that the bead surface of the tire is spaced from the wheel rim to provide an annular air inlet passage. Air at superatmospheric pressure is injected or introduced into the interior of the tire through the space between the tire bead and the wheel rim, while the displaced tire bead portion is positively retained away from the rim or is restrained against movement from its distorted position. The next further step, after air has been injected into the interior of the tire, is the release of the tire bead, as by releasing the tire from the axial compression forces exerted thereon, so that the tire inflation pressure will seal the tire bead to the wheel rim. Preferably, the supply of air under superatmospheric pressure into the tire interior is halted only after initial sealing contact between the rim and the bead has been effected to prevent the escape of air under pressure from the interior of the tire. In this preferred embodiment of the invention, the sealing of the tire bead to the rim takes place solely as a consequence of the release of the tire from the initially applied mechanical or distorting force.

In one specific embodiment of the present invention, a tubeless tire is inflated by positioning the tire between a pair of closure plates spaced axially of the wheel and each having an annular, axially extending seal ring adapted to engage the tire side wall radially outwardly of the wheel rim but in closely spaced relationship thereto. Thus, the seal ring engages the reinforced, thickened portion of the tire side wall immediately adjacent the tire bead. The plates, being in sealing engagement with the side walls, define a pressure chamber which encompasses and includes the wheel rims and the annular bead portions of the tire immediately adjacent to the wheel rims. Next, the plates are urged toward one another axially of the wheel, so that the tire side walls are subjected to a compression force acting axially of the wheel and in opposite directions to distort the tire in such manner that the tire beads are spaced from the wheel rims. The chamber is thus in communication with the interior of the tire through the annular passages defined between the tire beads and the wheel rims.

Upon the introduction of air at superatmospheric pressure into the interior of the chamber, the interior of the distorted tire is inflated to a pressure which is preferably greater than the final inflation pressure of the tire. Then, after inflation to the greater pressure, the axial compression forces upon the tire side walls are relieved, as by separation of the plates, so that the tire beads then move into initial sealing contact with the wheel because of the attempt of the tire to assume its normal inflated configuration. Finally, the supply of air to the chamber is cut off and the tire beads move outwardly to their final seated sealing engagement with the rim under the tire inflation pressure. The final pressure within the tire is less than the pressure under which the tire was initially filled, but the distention of the tire from its initially distorted condition to its final inflated position insures the presence of the desired interior tire pressure.

The apparatus of the present invention preferably takes the form of chamber-defining means for enclosing the wheel and adjacent annular portions of the tire side walls and including means sealingly engaging the tire side walls, means for subjecting the interior of the chamber and of the tire to air at superatmospheric pressure, and means for urging the chamber-defining elements toward one another to distort the tire side walls and beads from the rim of the wheel.

It is, therefore, an important object of the present invention to provide a novel and improved method and apparatus for the inflation of tubeless tires.

Another important object is the provision of a method of inflating a tubeless tire by positively displacing a tire side wall bead portion from a wheel rim.

It is a further object of this invention to provide a method for the inflation of tubeless tires positioned upon a wheel rim and involving the steps of forcing an annular tire bead from the wheel rim to provide an air passage therebetween, inflating the tire interior through the passage by the injection of superatmospheric air, and restraining the tire bead from engagement with the rim until inflation of the tire is complete.

Still another important object is the provision of an apparatus for inflating a tubeless tire including means for defining an inflation chamber encompassing a wheel and an adjacent portion of the tire side wall and including the tire bead, means for introducing air under pressure into the interior of the chamber, and means for forcibly deflecting and restraining the tire bead from engagement with a wheel rim until inflation is completed.

It is yet another object of this invention to provide a method for the inflation of a tubeless tire positioned between the rims of a wheel wherein the tire is distorted under axial compression to space tire beads from the wheel rim, air is injected into the tire between the bead and the rim and the tire is released from compression only after a predetermined pressure in the interior of the tire has been attained.

Yet a further important object is the provision of an inflation apparatus for tubeless tire including means defining a pressure chamber for completely enclosing a wheel and the adjacent portions of the tire side walls and including means for deflecting both tire beads from the associated rims, and means for introducing air under pressure into the chamber and into the tire interior through said deflected tire beads.

These and other objects will be more apparent from the following detailed description of a preferred embodiment of my invention and by reference to the drawings forming a part hereof wherein:

On the drawings:

Figure 1 is an elevational view of a tire inflating apparatus of the present invention;

Figure 2 is a front elevational view of the apparatus illustrated in Figure 1;

Figure 3 is a sectional view, with parts shown in elevation, taken along the plane 3—3 of Figure 1 and illustrating the position of the apparatus when carrying out the inflation steps of the method of the present invention;

Figure 4 is a view similar to Figure 3, but illustrating the apparatus in its position assumed after inflation of the tire and at the point of initial sealing engagement between the tire beads and the wheel rims;

Figure 5 is a fragmentary sectional view illustrating a portion of the apparatus of Figure 1 in its position assumed during the position of the apparatus illustrated in Figure 4;

Figure 6 is a view similar to Figure 3 and 4 illustrating the condition of the apparatus when the tire is fully inflated and the tire beads are seated upon the wheel rims; and Figure 7 is a greatly enlarged, sectional view, illustrating a portion of the apparatus of Figure 1 which sealingly engages the tire side walls.

As shown on the drawings:

In Figure 1, reference numeral 10 refers generally to an apparatus of the present invention.

The apparatus comprises generally a fixed upper closure plate 11 fixedly supported, as by central support element 12, and having a depending annular seal ring 13 secured to the under surface of the plate 11. A second closure plate 14 is adapted for movement toward and away from the upper plate 11, the plate 14 being provided with guide blocks 15 slidable in vertically extending, laterally spaced guides 16 for guiding this movement of the plate 14. The plate 14 is also provided with an annular seal ring 17 similar to seal ring 13 and extending upwardly from the plate 14 toward the plate 11.

The plates 14 are disposed for relative vertical movement, the lower plate 14 being slidably mounted for movement toward and away from the plate 11 upon energization of actuating mechanism indicated generally at 20. More particularly, this actuating mechanism comprises a transversely extending lower shaft 21 having an actuating crank 22 fixed to one extremity thereof for co-rotation, as by a key 23. The lower end of the arm 22 is pivotally secured, as at 24, to the terminal free end of an actuating rod 25 which carries a piston 26 disposed within a fluid pressure cylinder 27 which may be of either the hydraulic or pneumatic type and which is connected through inlet and outlet lines 28 to a suitable source of fluid under pressure. The cylinder 27 is pivotally connected, as at 29, to a fixed support 30 to accommodate such swinging movement of the cylinder 27 as may be necessary during actuation of the crank arm 22 and the shaft 21.

The shaft 21 is journalled by suitable means, as by a pair of pillow blocks 31, and secured to the shaft are a pair of laterally spaced cams 32 which peripherally engage cam followers or rollers 33 mounted through arms 34 on the movable closure plate 14. Each cam 32 has its periphery contoured to provide a high point 35 at which the plate 14 is moved to its uppermost position (illustrated in Figure 1), a dwell portion 36 joined to the high point 35 through a rather abrupt drop-off surface 37, and a low point 38 at which the plate 14 is in its lowermost position (illustrated in dotted outline in Figure 1).

As best illustrated in Figures 3, 4, 6 and 7, the annular seal rings 13 and 17 of the plates 11 and 14, respectively, extend generally axially of a wheel 40 when the wheel is interposed between the plates 11 and 14. The seal rings terminate in annular sealing surfaces, best illustrated in Figure 7, and comprising a terminal relatively sharp knife edge 41 adapted to initially contact the side wall of a tire 42, as will be hereinafter more fully described, and merging into a frusto-conical, side wall-contacting surface 43 which slopes axially away from and radially outwardly of the wheel to provide a sealing, tire-engaging surface of substantial contact area.

Also, the seal ring 17 secured to the plate 14 is provided with an interiorly threaded pipe nipple 44 communicating with the interior of the seal ring and adapted for threaded connection to an elbow 45 or similar fitting which is connected to a fluid pressure source through a conduit 46. Interposed between the pressure source and the nipple 44 are a regulating valve 47 for regulating the pressure introduced through the nipple to a predetermined pressure value, say on the order of 60 pounds per square inch, and an off-on valve 48 which may be manually or automatically actuated to control the actual introduction of air under superatmospheric pressure through the nipple 44.

The function of the apparatus as heretofore described, and the method of the present invention may be best understood by reference to the operation of the device heretofore described. This operation is as follows: a tubeless tire, such as the tire 42, disposed between the rims of a wheel, such as the wheel 40, is interposed between the two plates 11 and 14. As illustrated in Figures 3, 4 and 6, this may be accomplished by superimposing the wheel 40 over the ring 17 of the lower plate 14, the annular seal ring 17 being sufficiently large to completely encompass the wheel 40 and a portion of the tire 42. A plurality of upstanding support posts 49 are secured to the upper surface of the lower plate 14 to support the wheel.

Of course, when the plates 11 and 14 are in their furthest spread position to accommodate the entry of the wheel in the tire therebetween, the cylinder 27 is energized, as by the introduction of fluid pressure through the line 28 to retract the actuating rod 25 with the piston being displaced to its furthest right hand position and with the cam follower 33 resting upon the low point 38 of the cam 32.

The cylinder 27 is now actuated to displace the piston 26 and the actuating rod 25 to the left, rotating the cam 32 in a clockwise direction until such time as the cam follower 33 rides upon the high point 35 of the cam. The apparatus is now in the condition illustrated in Figures 1 and 3. The plate 14 has been moved upwardly with respect to the plate 11 with the annular seal rings 13 and 17 contacting the tire side walls, so that the tire is subjected to an axial compression force acting upon the tire side walls at a thickened, reinforced portion thereof adjacent the tire bead portions 42a.

The axial distortion of the tire caused by its forcible engagement by the seal rings will cause the tire beads 42a to be forcibly displaced toward a medial radial plane of the wheel, indicated at A (Figure 3). The wheel 40 will be supported upon the support columns 49 carried by the lower plate 14.

During the relative displacement of the end plates 11 and 14, accomplished by movement of the cam 32, the relatively thin knife edges 41 initially sealingly engage the tire side walls 42b at a location closely adjacent the tire beads 42a and at a thickened portion of the tire side wall. Further axial displacement of the plates will cause the relatively larger surface 43 to engage the side walls so that a substantial area of the side walls is contacted by the sealing rings and the tire is correspondingly distorted from its normal inflated shape to reduce the interior volume of the tire and to deflect the tire beads from the corresponding wheel rims 40a.

In addition to the distortion of the tire 42 to remove the tire beads 42a from the wheel rims 40a, the engagement of the seal rings 13 and 17 with the tire side walls 42b seals the annular rings to the tire to form a chamber completely enclosing the wheel 40 and encompassing the annular portions of the side walls radially inwardly from the seal rings 13 and 17, and including the tire beads 42a. Next, air under superatmospheric pressure is introduced into this sealed chamber through the nipple 44, by actuation of the valve 48, either manually or automatically by means not shown. Air under pressure, say on the order of 60 pounds per square inch, is introduced into the closed chamber and flows from the chamber into the interior of the tire through the annular passages provided between the spaced tire beads 42a and wheel rims 40a. Thus, the tire is filled with air at superatmospheric pressure, which pressure is stabilized throughout the entire pressure chamber and the tire interior.

The next step in the practice of the method is the introduction of fluid under pressure through the line 28 into the interior of the cylinder 27 so as to move the piston 26 in a rightward direction, i.e., toward the post 30. As the cam roller 33 progresses over the transition portion 37 of the cam and onto the dwell surface 36 thereof, the axial distortion pressure acting upon the tire is relieved.

The weight alone of the lower plate 14 and the annular seal ring 17 will force the cam follower 33 to follow the cam contour, and this movement will be aided by the attempted assumption by the tire of its normally inflated contour, at which the tire interior volume is substantially greater than the volume of the tire as distorted by the axial forces exerted thereon by the seal rings and plates. Thus, the tire beads will move away from the central medial plane A of the wheel 40 until such time as the tire beads contact the wheel rims (as illustrated in Figure 4). At this time, the interior of the tire is isolated from the interior of the chamber.

As actuation of the piston 26 in its rightward direction continues, the cam will traverse the cam surface toward the low point 38 and the seal ring 17 will be progressively downwardly retracted until the plates assume the position as illustrated in dotted outline in Figure 1 at which time clearance between the plates and the annular seal rings will be sufficient to accommodate the withdrawal of the tire and wheel assembly. During this period of movement of the plate 14 and the ring 17 downwardly, a position will be obtained, although momentarily, as illustrated in Figure 6 wherein the tire beads are fully seated upon the tire rims under the inflation pressure of the tire and under those forces generated by expansion of the previously distorted and partially collapsed tire carcass.

The communication of the chamber with the tire interior will be cut off at all times after the position in Figure 4 is obtained, and the supply of superatmospheric air through the nipple 44 may be cut off at any subsequent time, as by manual or automatic manipulation of the valve 48, without any danger of losing air from the tire interior.

Thus, it will be appreciated that the present invention provide a new and novel method for inflating a tubeless tire wherein the tire is deliberately distorted under an axial compression force to insure the positive displacement of the tire bead from the wheel rim and to deliberately distort the tire until the interior volume thereof is substantially reduced compared with the volume of the normally inflated tire. The tire is held in this distorted condition until it is filled with superatmospheric air, the compressive or distortive force is then removed and the tire is allowed to sealingly engage the wheel rims under the forces of inflation and by the release of the distortive force formerly exerted thereon.

This method results in the positive filling of the tire, the prevention of sealing of the tire to the wheel rims by positive displacement action occurring until inflation is complete, the release of the distortive action only after completion of the inflation cycle, and the complete sealing of the tire to the wheel under the inflation forces of the tires, the fluid pressure within the tire naturally attempting to force the tire to assume its largest interior volume.

Further, by contacting and deflecting a portion of the side wall immediately adjacent the tire bead, the mechanical force exerted on the tire operates independently of any differential in pressure between the tire interior and the inflation chamber. In other words, initial sealing engagement of the bead with the rim is independent of the fluid pressure forces acting thereon and sealing occurs solely as a consequence of relief of the mechanical distortion force.

While preferred embodiments have been described above in detail, it will be understood that numerous modifications might be resorted to without departing from the scope of my invention as defined in the following claims.

I claim:

1. In a method of inflating a tubeless tire positioned between the rims of a wheel and having its bead portions and the wheel enclosed in an air-tight chamber, the steps of forcing an annular portion of the tire side wall toward a medial radial plane of the wheel to deflect the adjacent tire bead from the corresponding wheel rim, introducing air at superatmospheric pressure between said bead and said rim into the tire interior, maintaining the bead deflected from the rim during the inflation, and releasing the side wall portion after inflation to accommodate engagement of the bead with the rim, thereby sealing the tire to the wheel.

2. In a method of inflating a tubeless tire positioned between the rims of a wheel, the steps of completely enclosing the wheel and adjacent annular portions of the tire, including the bead portions thereof, in an airtight chamber; deflecting both tire beads toward a central radial plane of the wheel so that the chamber is in communication with the interior of the tire; filling the chamber and the tire with air at superatmospheric pressure; and releasing the tire beads for movement into contact with the wheel rims only after the tire has been filled.

3. In a method of inflating a tubeless tire assembled on a wheel having rims normally sealingly engageable with the tire beads, the steps of sealingly engaging the relatively thick portions of the side walls of the tire adjacent the tire beads to form an airtight chamber encompassing the wheel and the tire beads, forcing a bead of a side wall from the adjacent rim, filling the chamber and the tire with superatmospheric air pressure, and releasing the force from the tire while maintaining sealing engagement with the side wall to accommodate sealing engagement of the bead with the rim only after the tire is filled.

4. In a method of inflating a tubeless tire positioned between the rims of a wheel, the steps of sealingly engaging the relatively thick annular portions of the tire side walls in closely spaced relation to the tire beads; subjecting the engaged portion of a side wall to a distorting force acting generally axially of the wheel to space the tire bead from the adjacent rim; simultaneously introducing air at superatmospheric pressure between the bead and rim to fill the tire and maintaining said force on the side wall; and relieving said force after said tire has been filled and while maintaining sealing engagement with said side wall to accommodate sealing engagement between said bead and said rim.

5. An apparatus for inflating a tubeless tire positioned between the rims of a wheel, comprising spaced plates adapted to receive a wheel therebetween, an annular seal ring secured to each of the plates, respectively, and adapted to engage the side walls of a tire on the wheel, means for urging said plates toward one another with the wheel and tire therebetween, initial engagement of said rings with the tire forming a closed pressure chamber between the plates and further movement of said plates causing said rings to deflect the tire beads from the wheel rims, and means for introducing air under pressure into said chamber and the interior of said tire.

6. In an inflation apparatus for a tubeless tire, a pair of separable means defining a pressure chamber for completely enclosing a wheel and the adjacent portions of the tire side walls and including means for deflecting both tire beads from the associated rims, means for holding said separable means in fixed bead deflecting position, means for introducing air under pressure into said chamber and into the tire interior through said deflected tire beads, and means for releasing said separable means allowing said beads to seat under internal tire pressure.

7. An inflation apparatus for a tubeless tire mounted on a wheel between the rims thereof, comprising a pair of closure elements adapted to receive a wheel and tire therebetween, means on said elements for sealingly engaging the tire side walls immediately adjacent the wheel rims, means urging said engaging means into extended forcible engagement with said side walls to deflect and hold the same from the wheel rims during inflation, means for introducing air at greater than tire inflation pressure into the tire interior past the deflected side walls thereof, and means for releasing said closure elements during continuing introduction of air until the tire beads have seated under internal air pressure.

References Cited in the file of this patent
UNITED STATES PATENTS

| | | |
|---|---|---|
| 799,922 | Moxham | Sept. 19, 1905 |
| 2,418,849 | Polt | Apr. 15, 1947 |
| 2,566,315 | Christofoli et al. | Sept. 4, 1951 |
| 2,728,105 | Pacciarini | Dec. 27, 1955 |
| 2,779,397 | Kohsiek | Jan. 29, 1957 |

FOREIGN PATENTS

| | | |
|---|---|---|
| 607,925 | Great Britain | Sept. 7, 1948 |